(12) United States Patent
Alkalay et al.

(10) Patent No.: US 10,719,253 B2
(45) Date of Patent: Jul. 21, 2020

(54) EFFICIENT COMPRESSION OF DATA IN STORAGE SYSTEMS THROUGH OFFLOADING COMPUTATION TO STORAGE DEVICES

(71) Applicant: EMC IP Holding Company LLC, Hopkinton, MA (US)

(72) Inventors: Amitai Alkalay, Kadima (IL); Zvi Schneider, Tel Aviv (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 16/176,446

(22) Filed: Oct. 31, 2018

(65) Prior Publication Data

US 2020/0133545 A1 Apr. 30, 2020

(51) Int. Cl.
*G06F 12/00* (2006.01)
*G06F 3/06* (2006.01)
*G06F 12/02* (2006.01)

(52) U.S. Cl.
CPC ............ *G06F 3/0641* (2013.01); *G06F 3/067* (2013.01); *G06F 3/0608* (2013.01); *G06F 3/0683* (2013.01); *G06F 12/0238* (2013.01); *G06F 12/0246* (2013.01)

(58) Field of Classification Search
CPC ...... G06F 3/0641; G06F 3/0608; G06F 3/067; G06F 3/0683; G06F 12/0238; G06F 12/0246
See application file for complete search history.

(56) References Cited

U.S. PATENT DOCUMENTS

| | | | |
|---|---|---|---|
| 7,444,464 | B2 | 10/2008 | Urmston et al. |
| 8,095,726 | B1 | 1/2012 | O'Connell et al. |
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |

(Continued)

FOREIGN PATENT DOCUMENTS

WO 2016111954 A1 7/2016

OTHER PUBLICATIONS

EMC Corporation, "Introduction to the Emc XtremIO Storage Array (Ver. 4.0): A Detailed Review," White Paper, Apr. 2015, 65 pages.

(Continued)

*Primary Examiner* — Shawn X Gu
(74) *Attorney, Agent, or Firm* — Ryan, Mason & Lewis, LLP

(57) ABSTRACT

A method comprises, in an information processing system implementing data deduplication and compression, wherein the information processing system comprises a set of data storage devices, receiving by at least one of the data storage devices comprising a processing device an instruction from the information processing system to perform at least a portion of a compression operation. The method also comprises performing the portion of the compression operation in response to the instruction, and sending a result of the performed portion of the compression operation to the information processing system.

20 Claims, 7 Drawing Sheets

(56) References Cited

U.S. PATENT DOCUMENTS

| | | | |
|---|---|---|---|
| 9,606,870 | B1 | 3/2017 | Meiri et al. |
| 9,716,754 | B2 | 7/2017 | Swift |
| 10,203,897 | B1 * | 2/2019 | Cheah .................. G06F 3/0638 |
| 10,339,112 | B1 * | 7/2019 | Ranade .................. G06F 11/16 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

US 10,719,253 B2

EFFICIENT COMPRESSION OF DATA IN STORAGE SYSTEMS THROUGH OFFLOADING COMPUTATION TO STORAGE DEVICES

FIELD

The field relates generally to information processing systems, and more particularly to storage in information processing systems.

BACKGROUND

In many information processing systems, storage systems are key elements. Storage systems, such as block based storage systems, are designed to store and retrieve large amounts of data. To store a block of data, a data block address and data block content are provided. The data block address is also used to retrieve the data block content stored at the specified address. Some storage solutions rely on address-based mapping of data, as well as address-based functionality of a storage system's internal algorithms. This is natural, since computing applications typically rely on address-based mapping and identification of data that is stored and retrieved. However, another solution in which data, internally within a storage system, is mapped and managed based on its content instead of its address can provide various substantial advantages. For example, such a content-based storage solution improves storage capacity efficiency since any duplicate block data will only occupy actual capacity of a single instance of that block. As another example, the content-based storage solution can improve performance since duplicate block writes do not need to be executed internally in the storage system. Content-based storage solutions, however, face various challenges.

SUMMARY

Embodiments provide techniques for performing deduplication and compression operations for a storage system by offloading at least a portion of a compression operation to one or more storage devices of the storage system. Through the use of processing capabilities internal to one or more storage devices to perform at least a portion of the compression operation, improvements in storage system performance are provided.

In one embodiment, an apparatus comprises, in an information processing system implementing data deduplication and compression, wherein the information processing system comprises a set of data storage devices, at least one of the data storage devices comprising a processing device configured to receive, from the information processing system, an instruction to perform at least a portion of a compression operation, to perform the portion of the compression operation in response to the instruction, and to send a result of the performed portion of the compression operation to the information processing system.

In some embodiments, the instruction comprises new data to be written in a compressed format, and the portion of the compression operation performed by the processing device of the at least one data storage device comprises performing standalone compression of the new data, performing differential compression of the new data with reference to existing data stored on the at least one storage device, and storing one of the standalone compressed new data and the differential compressed new data based at least in part on a comparison of a first compression ratio of the standalone compressed new data and a second compression ratio of the differential compressed new data.

In some embodiments, the instruction comprises new data to be written and a similarity score associated with the new data, performing the portion of the compression operation comprises comparing the similarity score associated with the new data to one or more similarity scores associated with existing data stored on the at least one storage device, and sending the result of the performed portion of the compression operation to the information processing system comprises providing a measure of similarity between the similarity score associated with the new data and the one or more similarity scores associated with the existing data stored on the at least one storage device.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
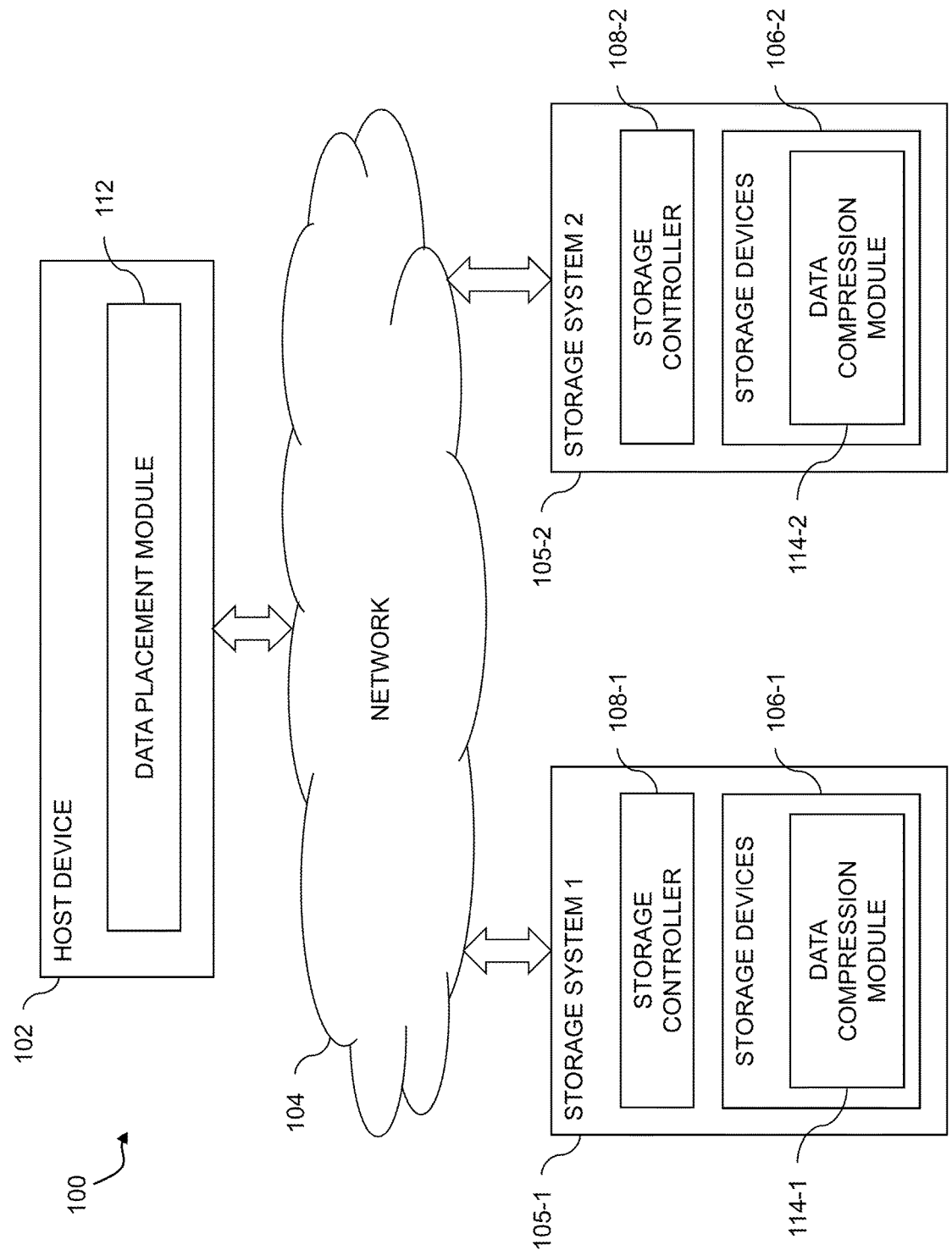
FIG. 1 is a block diagram of one example of an information processing system within which one or more illustrative embodiments are implemented.

FIG. 1 shows an information processing system 100 configured in accordance with an illustrative embodiment. The information processing system 100 comprises a host device 102, which may comprise one of a plurality of host devices of a computer system. The host device 102 communicates over a network 104 with first and second storage systems 105-1 and 105-2, also denoted as Storage System 1 and Storage System 2, respectively. The storage systems 105-1 and 105-2 are collectively referred to herein as storage systems 105. The host device 102 and storage systems 105 may be part of an enterprise computing and storage system, a cloud-based system or another type of system.

The host device 102 and storage systems 105 illustratively comprise respective processing devices of one or more processing platforms. For example, the host device 102 and the storage systems 105 can each comprise one or more processing devices each having a processor and a memory, possibly implementing virtual machines and/or containers, although numerous other configurations are possible.

The host device 102 and the storage systems 105 can additionally or alternatively be part of cloud infrastructure such as an Amazon Web Services (AWS) system. Other examples of cloud-based systems that can be used to provide one or more of host device 102 and storage systems 105 include Google Cloud Platform (GCP) and Microsoft Azure.

The host device 102 is configured to write data to and read data from the storage systems 105. The host device 102 and the storage systems 105 may be implemented on a common processing platform, or on separate processing platforms. A wide variety of other types of host devices can be used in other embodiments.

The host device 102 in some embodiments illustratively provides compute services such as execution of one or more applications on behalf of each of one or more users associated with the host device 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The storage systems 105 are accessible to the host device over the network 104. The storage system 105-1 comprises a plurality of storage devices 106-1 and an associated storage controller 108-1. Similarly, the storage system 105-2 comprises a plurality of storage devices 106-2 and an associated storage controller 108-2. The storage devices 106-1 and 106-2 are collectively referred to herein as storage devices 106. The storage controllers 108-1 and 108-2 are collectively referred to as storage controllers 108.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used. As described in further detail below, in illustrative embodiments the SSDs or storage devices 106 include a central processing unit (CPU), hardware accelerators or other internal processing or computing resources.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, at least one of the storage systems 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement one or both of storage systems 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The host device 102 in the FIG. 1 embodiment includes a data placement module 112 which provides logic and functionality for determining placement of new data to be written to storage systems 105, such as based on similarity scores computed for the new data and existing data stored on the storage devices 106 of the storage systems 105. In addition, the storage devices 106 implement respective data compression modules 114-1 and 114-2 (collectively, data compression modules 114), which provide logic and functionality for performing at least a portion of a compression operation using internal computing resources of the storage devices 106. The storage devices 106 are illustratively a special type of SSD or other storage device which includes CPU and memory or other internal processing resources that allow the storage devices 106 to process data "inside" the storage device internally and faster than would be possible by using a CPU or other processor of a host device or storage controller. The data compression modules 114 may also or alternatively provide logic and functionality for use in determining placement of new data to be written, such as by receiving a similarity score for new data to be written from the data placement module 112 and comparing that similarity score with similarity scores for existing data stored on the storage devices 106. The modules 112 and 114 may provide functionality and logic for performing the process illustrated in the flow diagram of FIG. 4, described in further detail below. The host device 102 should also be understood to include additional modules and other components typically found in conventional implementations of computers, servers or other host devices, although such additional modules and other components are omitted from the figure for clarity and simplicity of illustration.

The host device 102 and storage systems 105 in the FIG. 1 embodiment are assumed to be implemented using at least one processing platform each comprising one or more processing devices each having a processor coupled to a memory. Such processing devices can illustratively include particular arrangements of compute, storage and network resources.

The host device 102 and the storage systems 105 may be implemented on respective distinct processing platforms, although numerous other arrangements are possible. For example, in some embodiments at least portions of the host device 102 and one or both of the storage systems 105 are implemented on the same processing platform. The storage systems 105 can therefore be implemented at least in part within at least one processing platform that implements at least a portion of the host device 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 102 and storage systems 105 to reside in different data centers. Numerous other distributed implementations of one or both of the host device 102 and the storage systems 105 are possible. Accordingly, the storage systems 105 can also be implemented in a distributed manner across multiple data centers.

Additional examples of processing platforms utilized to implement host devices and/or storage systems in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host device 102, network 104, storage systems 105, storage devices 106, and storage controllers 108 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing functionality for performing deduplication and compression operations for a storage system by offloading at least a portion of a compression operation to one or more storage devices of the storage system will be described below.

Figure 2:
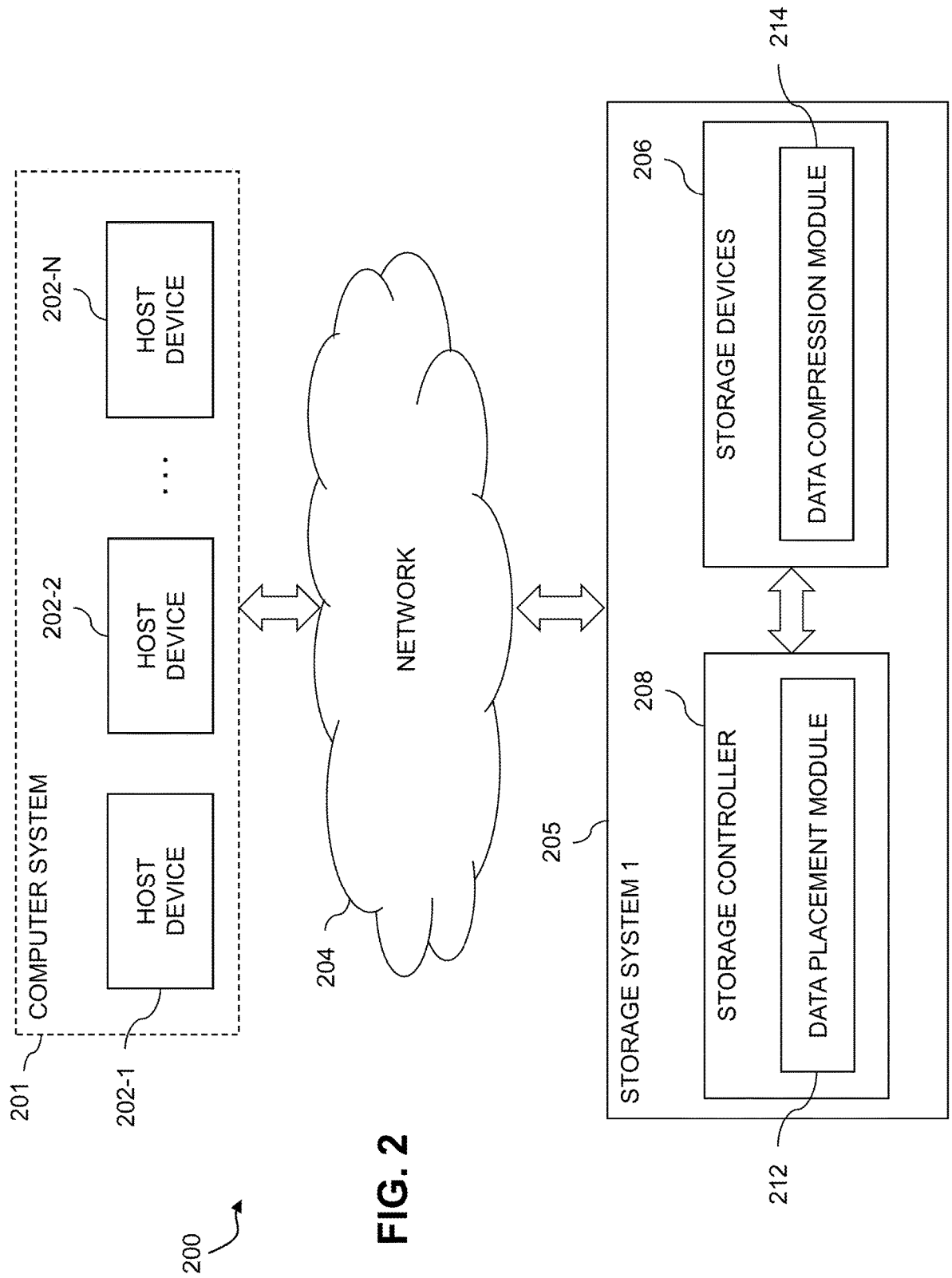
FIG. 2 is a block diagram of another example of an information processing system within which one or more illustrative embodiments are implemented.

FIG. 2 shows an information processing system 200 configured in accordance with another illustrative embodiment. The information processing system 200 comprises a computer system 201 that includes host devices 202-1, 202-2, . . . 202-N collectively referred to as host devices 202. The host devices 202 communicate over a network 204 with a storage system 205. The computer system 201 is assumed to comprise an enterprise computer system, cloud-based computer system or other arrangement of multiple compute nodes associated with respective users. The host devices 202 of the computer system 201 in some embodiments illustratively provide compute services such as execution of one or more applications on behalf of each of one or more users associated with respective ones of the host devices 202.

Similar to the storage systems 105 of system 100, the storage system 205 comprises storage devices 206 and a storage controller 208. However, in this embodiment, the functionality for performing deduplication and compression operations for a storage system by offloading at least a portion of a compression operation to one or more storage devices of the storage system is implemented in the storage system 205, rather than in one of the host devices 202. Accordingly, the storage controller 208 in this embodiment comprises data placement module 212, which is configured to operate in substantially the same manner as that described above for corresponding module 112 of the host device 102 in the system 100. The storage devices 206 comprise data compression module 214, which is configured to operate in substantially the same manner as that described above for the corresponding modules 114 of the storage devices 106 in the system 100.

In some embodiments, functionality for performing deduplication and compression operations for a storage system by offloading at least a portion of a compression operation to one or more storage devices of the storage system can be implemented partially in a host device and partially in the storage system. More particularly, illustrative embodiments as will be described below provide for utilizing processing capabilities on the storage devices 106/206 themselves to perform a portion of a compression operation, results of which are then provided to the host device (e.g., module 112) and/or the storage controller (e.g., module 212). Accordingly, illustrative embodiments are not limited to arrangements in which all such functionality is implemented in a host device or a storage system, and therefore encompass various hybrid arrangements in which the functionality is distributed over one or more host devices and one or more storage systems, each comprising one or more processing devices.

Illustrative embodiments overcome various drawbacks associated with performing deduplication and compression operations for a storage system in host devices or storage controllers of the storage systems by utilizing processing capabilities of the storage devices (e.g., SSDs) themselves to perform at least a portion of compression and data placement computations and operations. For example, "smart" SSDs are flash drives that are equipped with processing capabilities such as, for example, one or more internal central processing units (CPUs) and/or one or more hardware accelerator units as well as memory (e.g., 16 GB of dynamic random-access memory (DRAM)). One or more such processing capabilities are referred to herein as "a processing device" of the SSD. As will be explained in illustrative embodiments, such processing capabilities of the SSDs are used to perform operations over data in the drives without involving the host device (e.g., 102 in FIG. 1) or storage controllers (e.g., 108 in FIG. 1 or 208 in FIG. 2). The results of the operations performed by the internal processing capabilities of the SSDs are made available to the host device or storage controllers to perform further operations.

More particularly, optimization of the compression calculations leverages SSD processing capabilities which, in turn, optimizes both the bandwidth to the drives, as well as saving the CPU of the host device or storage controller needed for performing compression calculations.

For each new data item to be written, a command (instruction) is sent from a data placement module (112 in host device 102 or module 212 in storage controller 208) to the given drive (e.g., a data compression module thereof, such as modules 114 in storage devices 106 or module 214 in storage devices 206) to perform at least a portion of a compression operation using internal CPU and/or hardware acceleration engines of the given drive. The result of the compression operation is read from the given drive by the data placement module (112 or 212).

A storage device which has internal processing capabilities or computing resources is referred to herein as a "smart" storage device. The internal processing capabilities of a smart storage device may comprise memory and one or more internal CPUs, one or more hardware accelerators, etc. Such smart storage devices provide a number of advantages, including providing computing power or resources in close vicinity to the data stored thereon as well as higher internal available bandwidth between the internal processing resources and the underlying storage relative to the external bandwidth between the storage device and a storage controller or host device. The computing resources internal to smart storage devices as well as the higher internal bandwidth may be leveraged to provide improved performance for various functions of a storage system or array which includes the smart storage devices.

In some storage systems, functionality including but not limited to deduplication functionality are often bound by the CPU, memory, and storage bandwidth between a storage controller and the storage devices, or between a host device and the storage devices. As such, storage systems may use relatively large deduplication blocks (e.g., 16 kilobytes (KB)), and relatively simple compression schemes (e.g., where after compression a storage system or array may pack multiple compressed blocks in a single block). As a result of these and other limitations, deduplication performance suffers as does the potential compression ratio.

Illustrative embodiments provide techniques which leverage the advantages of smart storage devices (e.g., internal processing capabilities, higher available internal bandwidth, etc.) to provide improved performance through improved deduplication ratios, improved compression ratios, and through the introduction of global compression.

One type of smart storage device is smart SSDs. Smart SSDs are SSD drives with compute capabilities, such as ARM processors, built in. Such built-in compute capabilities allow processing of data stored on the smart SSD with a much higher bandwidth than that available between the main CPU of the storage controller or a host device and the smart SSD. Advantages of smart SSDs or more generally smart storage devices include improvements in throughput, latency and energy requirements. The increased bandwidth to flash chips provided by smart SSDs, and increased control over parallelism across flash channels provide improvements in throughput. Data dependent access to the flash chips does not incur the latency overheads to a host device or storage controller memory and the host or storage controller software stack, thus providing reduced latency. Further, smart storage devices including smart SSDs can avoid moving huge volumes of data to host memory and host CPU for computation, thus reducing energy consumption.

Figure 3:
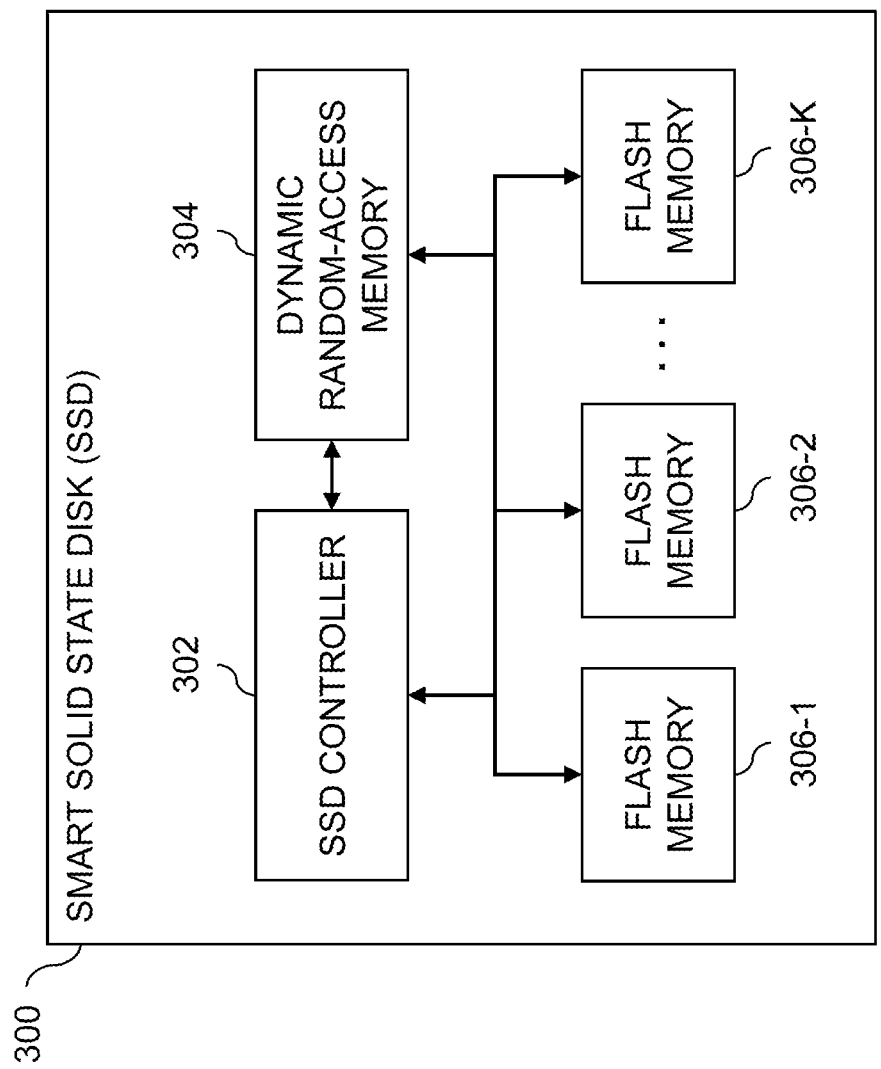
FIG. 3 is a block diagram of a storage device configured with internal processing capabilities in an illustrative embodiment.

FIG. 3 shows an example of a smart or programmable SSD 300. As shown the smart SSD 300 includes an SSD controller 302, dynamic random-access memory (DRAM) 304, and a number of flash memory disks 306-1, 306-2, . . . 306-K (collectively, flash memory 306 or flash memory devices 306). The SSD controller 302 illustrative provides a processor, where the processor may implement a number of software-programmable controllers (e.g., 16 cores, operating at 2 Gigahertz (GHz) or greater per core). The SSD controller 302 may also or alternatively implement a number of hardware accelerators (e.g., application-specific integrated circuits (ASICs), field-programmable gate arrays (FPGAs), etc.). In some embodiments, the software-programmable controllers and/or hardware accelerators implement compression and encryption modules or functionality, for performing various types of compression and encryption operations internally to the smart SSD 300 as described elsewhere herein. The SSD controller 302, via software-programmable controllers and/or hardware accelerators, may provide high bandwidth to the flash memory 306 (e.g., 50 gigabits per second (Gbps) bandwidth).

In some embodiments, the DRAM 304 may comprise 16 gigabytes (GB) of DRAM or other memory. The flash memory 306 may comprise a number of flash memory devices, each having one or more channels for communication with the SSD controller 302 and DRAM 304. In some embodiments, for example, each of the flash memory devices 306 may provide bandwidth of approximately 533 megabytes (MB) per second. Thus, if there are 32 flash memory devices 306 (e.g., K=32), the flash memory devices 306 collectively provide approximately 16 GB/sec bandwidth.

Creating global compression and deduplication (e.g., across all storage devices of a storage array or storage system) is a complex task. Global compression and deduplication functionality, for example, requires calculating similarity scores and not just content-based signatures (e.g., hash signatures) for data to be written to the storage system. Such functionality also requires running differential compression algorithms, and storing the data in a more efficient compressed format. For example, the XtremIO™ storage array automatically reduces (e.g., deduplicates and compresses) data as it enters the system, processing the data in the form of data blocks. The deduplication is global over the entire system, and is performed in real-time. After deduplication, the data is compressed inline before being written to the storage devices of the XtremeIO™ storage array (e.g., to SSDs).

Deduplicated storage arrays, however, typically use large deduplication blocks. Further, the management of compressed data chunks is a complex task that is done at the storage array level. Smart storage devices such as smart SSDs provide significant CPU or other processing capabilities. Illustrative embodiments utilize smart storage devices such as smart SSDs to manage compressed data chunks and expose just the amount of free storage space to the storage controller of the storage array or storage system. Advantageously, this will reduce CPU and memory utilization of the main CPU of the storage array or storage system, or the host CPU of a host device coupled to the storage array or storage system.

As smart storage devices such as smart SSDs have both available memory and computing power, a storage system or storage array in illustrative embodiments leverages the smart storage devices to calculate and keep similarity score tables, as well as create differential compression data. Differential compression data refers to compressing new data using old data as a reference. Differential compression (e.g., using Lempel-Ziv type compression) allows compressed data to have references to other existing data. If there are common areas between data being compressed and data already stored, the compression of the new data using differential compression achieves a much higher compression ratio.

Some embodiments provide techniques which improve the compression ratios and deduplication ratios of a storage system or storage array. While various embodiments are described below with respect to a content-addressable storage (CAS) system such as an XtremIO™ storage array, it should be appreciated that these techniques may be used in various other types of storage systems and storage arrays, including other types of flash storage arrays. When a write request arrives at the CAS system, a content-based signature (e.g., a hash signature) is calculated. Based on the range of the content-based signatures (e.g., the hash range), the data to be written is sent to an appropriate data module of a storage controller of the CAS system. If the content-based signature does not exist (e.g., the data to be written is not already stored on one of the storage devices of the CAS system), the data module will compress the data to be written and assign the data to a location on a storage device of the CAS system. In some embodiments, the compression management functionality is moved from being handled by the storage controller of the CAS system to a smart storage device thereof. Due to the various advantages of smart storage devices (e.g., available processing power, improved internal bandwidth, etc.), this allows for the smart storage devices to manage differential compression and use finer granularity similarity scores for improved storage system performance.

To offload the compression management to the smart storage devices, the data module implemented by the storage controller of the CAS system will not compress the data to be written. Instead, the data module will calculate a similarity score for the data to be written (e.g., for a chunk of data). This computation should not take up many processing resources at the storage controller. In some embodiments, the similarity score computed by the data module is a sliding window rolling hash (e.g., a Rabin fingerprint) of 512 bytes, where only a few hashes (e.g., 2 or 4, or some other designated threshold number of hashes) with the highest values are kept and the hashes are 32 bits. It should be appreciated, however, that various other types of similarity scores may be used in other embodiments.

The data module utilizes the similarity score to make a decision on placement of the data to be written. In some embodiments, the placement decision is made based on the similarity score computed by the data module without consulting the smart storage devices. For example, the data module at the storage controller of the storage system, or a host device may maintain tables of similarity scores for data stored on the various smart storage devices of the storage system. The data module will select the smart storage device based on a comparison of the similarity score of the data to be written and the similarity scores for existing data stored on the smart storage devices. In other embodiments the decision may be made only by the similarity score without any tables kept such as by using the Rabin hash with the highest value.

In other embodiments, the placement decision is made based on the similarity score computed by the data module and consultation with the smart storage devices. A placement decision protocol between the smart storage devices and the data module of the storage controller, or more generally a processor of the storage controller or a host device, is used to decide which of the smart storage devices in the storage system has data that is most similar to the data to be written. To implement this protocol, the smart storage devices may maintain in memory the similarity scores for all data stored on that smart storage device.

Consider, by way of example, keeping a similarity score of 64 bits for every 16 KB of stored data. Assuming compression of ¼ for an 8 terabyte (TB) disk, 8 GB of space will be needed to store the similarity scores in memory of the smart storage device. As described above with respect to FIG. 4, a smart storage device such as a smart SSD may have 16 GB of DRAM available, and thus half the memory of the smart storage devices may be used for storing the similarity scores of data stored thereon.

The placement decision protocol will have the data module send the similarity score to all or some available smart storage devices of the storage system, and choose the smart storage device which holds similar data with high probability. In some embodiments, the smart storage devices may keep only a cache of similarity scores including popular similarity scores (e.g., for data that is frequently accessed, for data with a reference count above some designated threshold, etc.) for efficiency. In other embodiments, the smart storage devices may maintain a least recently used (LRU) cache where only newer similarity score are kept, or similarity scores with higher hit ratios and thus a higher amount of relevant similarity scores can be kept.

For each similarity score, the smart storage device memory will include the location of the corresponding data. When new data is written to the smart storage device, if similar data exists on that smart storage device, the smart storage device will compress the data alone, and will also compress the new data differential from the similar data. A determination is then made as to whether the compression ratio of the standalone compressed new data is better than the compression ratio of the differential compressed new data (e.g., whether some designated amount of storage resource savings are provided by utilizing the differential compressed new data). One of the standalone compressed new data and the differential compressed new data is then stored based on this determination.

In some embodiments, the smart storage devices manage the compressed data in buckets, based on compression ratios. In other embodiments, the smart storage devices may utilize other techniques for managing the compressed data which take advantage of the higher available internal bandwidth. The memory of the smart storage devices may keep or store data related to chunk dependencies. If the memory of the smart storage device is volatile, the chunk dependency data may be periodically flushed to disk or other nonvolatile storage thereof.

When the smart storage device tries to overwrite data, it will first check if there is a dependency on that data. If a dependency exists, the data which has differential dependency on it will either not be overwritten, or may be decompressed and recompressed as independent (e.g., if there is only one dependent chunk, or, more generally, fewer than a threshold number of dependent chunks).

Since the smart storage devices manage their own compression in some embodiments, a free data management protocol may be implemented between the smart storage device and the processor of the storage controller or host device to manage the amount of free data on the smart storage devices. Placement of chunks, for example, may change if a particular smart storage device is fuller than another. Due to the law of large numbers, however, it is expected that this movement will be limited or avoided altogether.

The operation of the information processing systems 100 and 200 will now be described in further detail with reference to the flow diagram of the illustrative embodiment of FIG. 4. The process as shown includes steps 400 through 404, and is suitable for use in systems 100 and 200 but is more generally applicable to other types of information processing systems in which a host device or storage system is configured to offload at least a portion of deduplication and compression operations to storage devices of the storage system.

Figure 4:
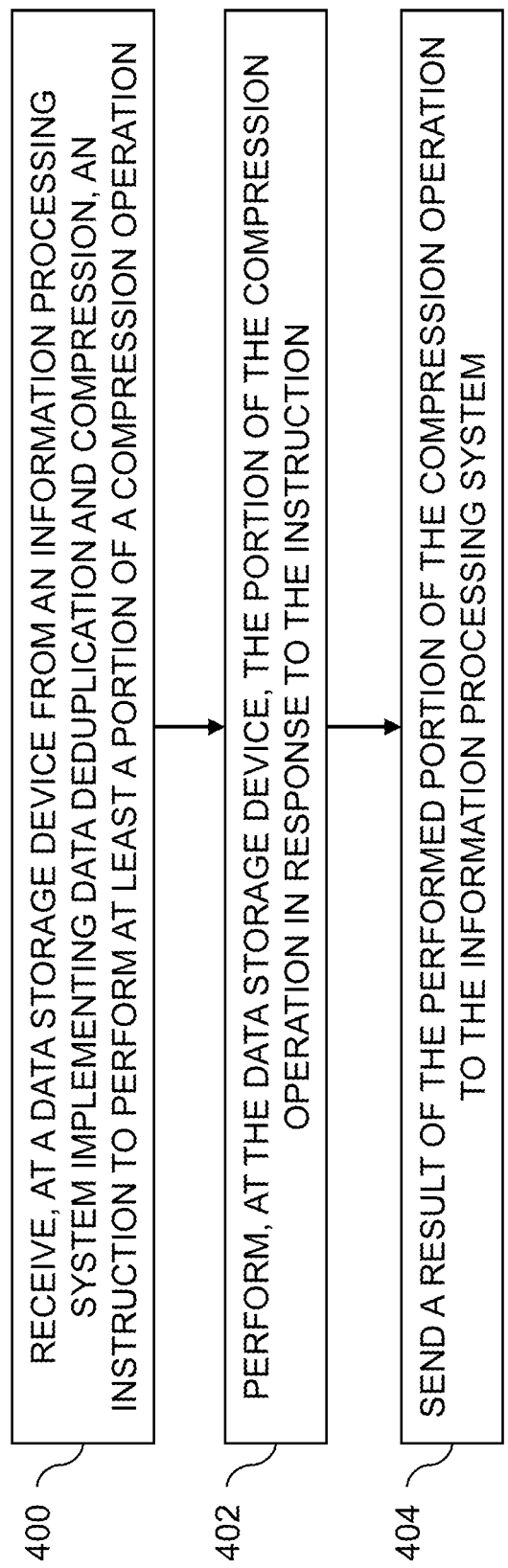
FIG. 4 is a flow diagram illustrating a methodology for using processing capabilities of a storage device to perform at least a portion of a compression operation in an illustrative embodiment.

The FIG. 4 process is performed by a processing device of at least one data storage device of a set of data storage devices of an information processing system that implements data deduplication and compression functionality. The set of storage devices may comprise SSDs (e.g., smart SSDs). The processing device associated with the at least one data storage device may comprise one or more CPUs or hardware accelerators that are internal to the at least one data storage device.

The process begins with step 400, where the processing device of the at least one data storage device receives, from the information processing system, an instruction to perform at least a portion of a compression operation.

In step 402, the processing device of the at least one data storage device performs the portion of the compression operation in response to the instruction. In some embodiments, the compression operation involves assisting in a data placement decision for new data to be written, such as using a similarity score for the new data that is part of the instruction. In other embodiments, the compression operation further or alternatively involves compression of the new data.

In step 404, the processing device of the at least one data storage device sends a result of the performed portion of the compression operation to the information processing system. In some embodiments, step 404 involves providing to the information processing system a measure of similarity of the new data to existing data stored on the at least one data storage device. Step 404 may also or alternatively include an acknowledgement that the new data has been written to the at least one data storage device, along with information regarding the compressed new data (e.g., its compression ratio, similarity score, etc.).

In some embodiments, the instruction received in step 400 includes new data that is to be written to the at least one data storage device in a compressed format. This instruction may be provided after the information processing system makes a standalone decision regarding data placement (e.g., without consulting the set of data storage devices), or may be provided after the set of data storage devices have provided results of portions of a compression operation (e.g., similarity measures) which assist the information processing system in making the data placement decision. In either case, performing the compression operation may include performing standalone compression of the new data and performing differential compression of the new data with reference to existing data stored on the at least one storage device. The processing device of the at least one data storage device will then store one of the standalone compressed new data and the differential compressed new data based at least in part on a comparison of a first compression ratio of the standalone compressed new data and a second compression ratio of the differential compressed new data (e.g., whichever provides a better compression ratio for the new data, whichever provides better overall compression of the new data and the existing data on that data storage device, etc.). Performing the differential compression of the new data may comprise utilizing a compression algorithm that allows the compressed new data to have one or more references to the existing data.

In some embodiments, the instruction received in step 400 includes the new data to be written and a similarity score associated with the new data. Step 402 may thus include comparing the similarity score associated with the new data to one or more similarity scores associated with existing data stored on the at least one storage device. Step 404 may thus include providing a measure of similarity between the similarity score associated with the new data and the one or more similarity scores associated with the existing data stored on the at least one storage device. In some embodiments, the similarity scores are determined using a rolling hash algorithm with a designated window size, such as a sliding window Rabin hash.

The information processing system may then utilize the various similarity measures to select one of the set of data storage devices on which the new data is to be stored (e.g., that data storage device whose existing data is most similar to the new data, and thus would benefit most from differential compression of the new data). The information processing system may then send an additional instruction to the selected data storage device, where the instruction directs the selected data storage device to store the new data thereon. The selected data storage device will then use its internal processing resources to compress the new data (e.g., using standalone or differential compression) and store the compressed new data. The selected data storage device may then send results back to the information processing system, such as an acknowledgement that the new data has been stored, possibly along with characteristics regarding the compression of the new data, or remaining free space on the selected data storage device.

In some embodiments, the processing device of the at least one data storage device maintains, in a memory of the at least one data storage device, a cache of similarity scores associated with the existing data stored on the at least one data storage device. The cache may comprise a LRU cache configured to maintain similarity scores for a designated threshold number of existing data items most recently stored on the at least one data storage device. The cache may also or alternatively maintain similarity scores for a designated threshold number of frequently accessed existing data items (e.g., existing data accessed more than a designated threshold number of times in a given time window, a top X most accessed existing data items, etc.) stored on the at least one data storage device.

In some embodiments, the processing device of the at least one data storage device is configured to maintain, in a memory of the at least one data storage device, dependency data for differential compressed existing data stored on the at least one data storage device. The dependency data is utilized to determine, when receiving requests to overwrite existing data stored on the at least one storage device using differential compression data, whether to overwrite the differential compression data. This determination may be made, for a given existing data item stored using the differential compression data, based on determining a number of other existing data items that reference the differential compression data for the given existing data item. If the number of other existing data items that reference the differential compression data for the given existing data item is below a designated threshold, the other existing data items that reference the differential compression data may be decompressed and then recompressed using standalone rather than differential compression.

It is to be understood that for any methodologies described herein, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems or for different storage devices on a particular storage system or systems.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 208 that is configured to control performance of one or more steps described herein can be implemented as part of what is more generally referred to herein as a processing platform comprising one or more processing devices each comprising a processor coupled to a memory. Such processing devices are to be distinguished from processing devices referred to herein with respect to the processing capabilities of the SSDs. In the case of a host device or storage controller, a given such processing device may correspond to one or more virtual machines or other types of virtualization infrastructure such as Docker containers or Linux containers (LXCs). The host device 102 of system 100 or the storage controller 208 of system 200, as well as other system components, may be implemented at least in part using processing devices of such processing platforms. For example, in a distributed implementation of the storage controller 208, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate functionality for performing deduplication and compression operations for a storage system by offloading at least a portion of a compression operation to one or more storage devices of the storage system as disclosed herein.

An illustrative embodiment of such a content addressable storage system will now be described with reference to FIG. 5. In this embodiment, a content addressable storage system 505 comprises a plurality of storage devices 506 and an associated storage controller 508. The content addressable storage system 505 may be viewed as a particular implementation of the storage system 205, and accordingly is assumed to be coupled to host devices 202 of computer system 201 via network 204 within information processing system 200.

The storage controller 508 in the present embodiment is configured to implement functionality for performing deduplication and compression operations for a storage system by offloading at least a portion of a compression operation to one or more storage devices of the storage system of the type previously described utilizing module 512, which is configured to operate in a manner similar to that described above for respective corresponding modules 112 and 212. The storage devices 506 also comprise a module 514, which is configured to operate in a manner similar to that described above for respective corresponding modules 114 and 214.

Figure 5:
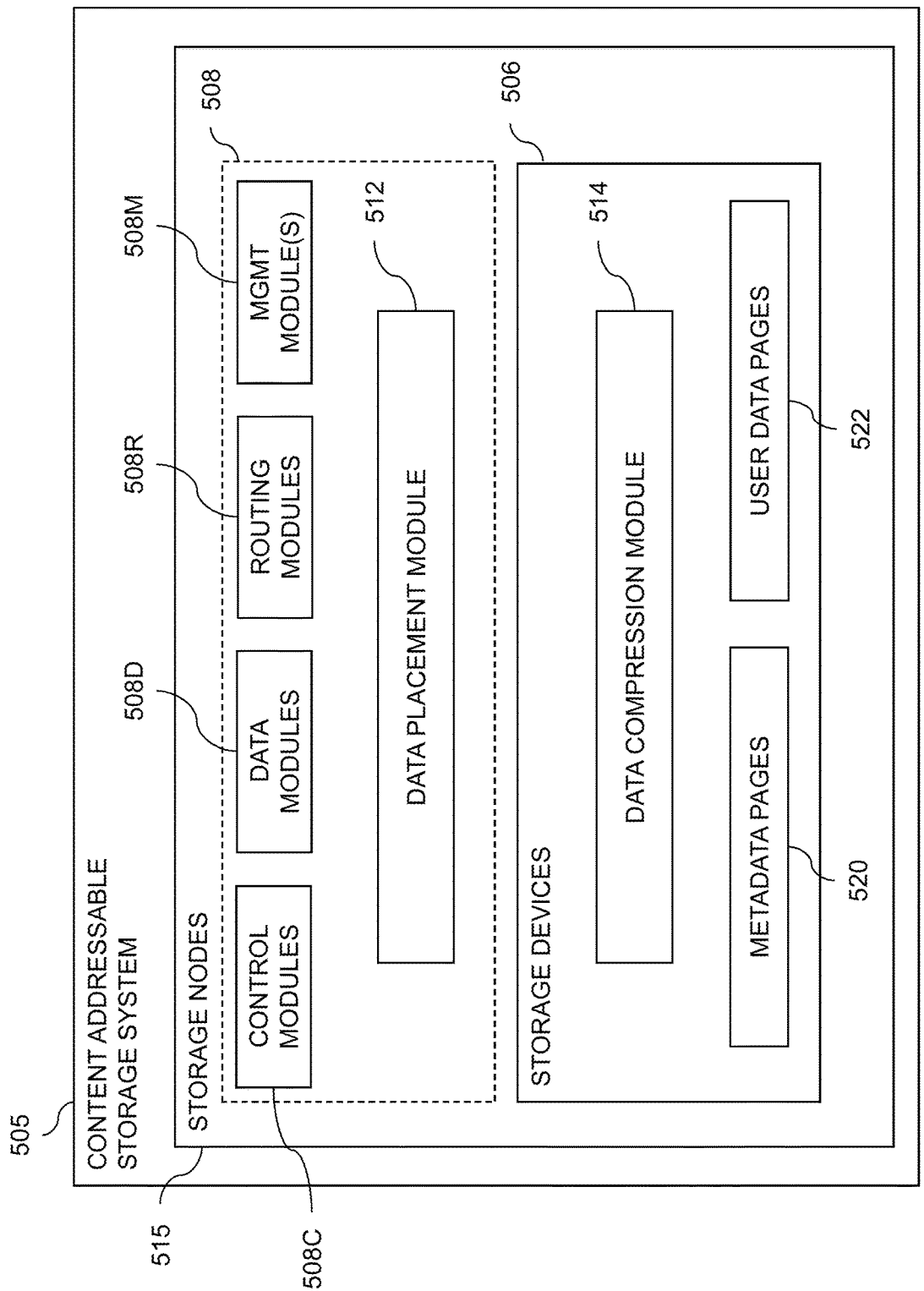
FIG. 5 shows a content addressable storage system having a distributed storage controller configured with functionality for offloading at least a portion of a compression operation to storage devices of the content addressable storage system in an illustrative embodiment.

The content addressable storage system 505 in the FIG. 5 embodiment is implemented as at least a portion of a clustered storage system and includes a plurality of storage nodes 515 each comprising a corresponding subset of the storage devices 506. Other clustered storage system arrangements comprising multiple storage nodes can be used in other embodiments. A given clustered storage system may include not only storage nodes 515 but also additional storage nodes coupled via a storage network. Alternatively, such additional storage nodes may be part of another clustered storage system of the system 200. Each of the storage nodes 515 of the storage system 505 is assumed to be implemented using at least one processing device comprising a processor coupled to a memory.

The storage controller 508 of the content addressable storage system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 may be more particularly referred to as a distributed storage controller.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the content addressable storage system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515.

Each of the storage nodes 515 of the storage system 505 therefore comprises a set of processing modules configured to communicate over one or more networks with corresponding sets of processing modules on other ones of the storage nodes. A given such set of processing modules implemented on a particular storage node illustratively includes at least one control module 508C, at least one data module 508D and at least one routing module 508R, and possibly a management module 508M. These sets of processing modules of the storage nodes collectively comprise at least a portion of the distributed storage controller 508.

Communication links may be established between the various processing modules of the distributed storage controller 508 using well-known communication protocols such as IP, Transmission Control Protocol (TCP), and remote direct memory access (RDMA). For example, respective sets of IP links used in data transfer and corresponding messaging could be associated with respective different ones of the routing modules 508R.

Although shown as a separate module of the distributed storage controller 508, the module 512 in the present embodiment is assumed to be distributed at least in part over at least a subset of the other modules 508C, 508D, 508R and 508M of the storage controller 508. Accordingly, at least portions of the functionality of the module 512 may be implemented in one or more of the other modules of the storage controller 508. In other embodiments, the module 512 may be implemented as stand-alone module of the storage controller 508.

The storage devices 506 are configured to store metadata pages 520 and user data pages 522 and may also store additional information not explicitly shown such as checkpoints and write journals. The metadata pages 520 and the user data pages 522 are illustratively stored in respective designated metadata and user data areas of the storage devices 506. Accordingly, metadata pages 520 and user data pages 522 may be viewed as corresponding to respective designated metadata and user data areas of the storage devices 506.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 520 and the user data pages 522.

The user data pages 522 are part of a plurality of logical units (LUNs) configured to store files, blocks, objects or other arrangements of data, each also generally referred to herein as a "data item," on behalf of users associated with host devices 202. Each such LUN may comprise particular ones of the above-noted pages of the user data area. The user data stored in the user data pages 522 can include any type of user data that may be utilized in the system 200. The term "user data" herein is therefore also intended to be broadly construed.

Also shown as part of storage devices 506 is module 514 which corresponds to modules 114 and 214 described above. Recall that in one or more embodiments each storage device 506 has a module 514 for performing at least a portion of the operations associated with performing deduplication and compression operations for a storage system by offloading at least a portion of a compression operation to the storage devices 506 as described herein.

The content addressable storage system 505 in the embodiment of FIG. 5 is configured to generate hash metadata providing a mapping between content-based digests of respective ones of the user data pages 522 and corresponding physical locations of those pages in the user data area. Content-based digests generated using hash functions are also referred to herein as "hash digests." The hash metadata generated by the content addressable storage system 505 is illustratively stored as metadata pages 520 in the metadata area. The generation and storage of the hash metadata is assumed to be performed under the control of the storage controller 508.

Each of the metadata pages 520 characterizes a plurality of the user data pages 522. For example, a given set of user data pages representing a portion of the user data pages 522 illustratively comprises a plurality of user data pages denoted User Data Page 1, User Data Page 2, . . . User Data Page n. It should be noted that usage of the variable n in this user data page context is unrelated to its usage elsewhere herein.

Each of the user data pages 522 in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 506.

Each of the metadata pages 520 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 520 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 505 is illustratively distributed among the control modules 508C.

The functionality provided by module 512 in this embodiment is assumed to be distributed across multiple distributed processing modules, including at least a subset of the processing modules 508C, 508D, 508R and 508M of the distributed storage controller 508.

For example, the management module 508M of the storage controller 508 may include logic that engages corresponding logic instances in all of the data modules 508D in order to implement processes for compression management. When a write request arrives to the storage system 505, a content-based signature (e.g., a hash) is calculated and, based on the content-based signature, that data is sent to an appropriate one of the data modules 508D. When the content-based signature does not yet exist, the data should be compressed and assigned to a location on one of the storage devices 506. Rather than implement that functionality in the data module 508D, some embodiments move compression management functionality internally to the storage devices 506 as described herein to improve the efficiency of the storage system 505.

In some embodiments, the content addressable storage system 505 comprises an XtremIO™ storage array suitably modified to incorporate techniques for performing deduplication and compression operations for a storage system by offloading at least a portion of a compression operation to the storage devices 506 of the storage system 505 as disclosed herein.

In arrangements of this type, the control modules 508C, data modules 508D and routing modules 508R of the distributed storage controller 508 illustratively comprise respective C-modules, D-modules and R-modules of the XtremIO™ storage array. The one or more management modules 508M of the distributed storage controller 508 in such arrangements illustratively comprise a system-wide management module ("SYM module") of the XtremIO™ storage array, although other types and arrangements of system-wide management modules can be used in other embodiments. Accordingly, functionality for performing deduplication and compression operations for a storage system by offloading at least a portion of a compression operation to one or more of the storage devices 506 of the storage system 505 in some embodiments is implemented under the control of at least one system-wide management module of the distributed storage controller 508, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 508C such that control of the slices within the storage controller 508 of the storage system 505 is substantially evenly distributed over the control modules 508C of the storage controller 508.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 505 each illustratively comprise one or more IO operations directing that at least one data item of the storage system 505 be written to in a particular manner. A given write request is illustratively received in the storage system 505 from a host device, illustratively one of the host devices 202. In some embodiments, a write request is received in the distributed storage controller 508 of the storage system 505 and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 515 communicate with one another over a high-speed internal network such as an InfiniBand network. The C-modules, D-modules and R-modules coordinate with one another to accomplish various 10 processing tasks.

The write requests from the host devices identify particular data pages to be written in the storage system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 505 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 505.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 506. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 505 correspond to respective physical blocks of a physical layer of the storage system 505. The user data pages of the logical layer are organized by LBA and have reference via respective content-based signatures to particular physical blocks of the physical layer.

Each of the physical blocks has an associated reference count that is maintained within the storage system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement functionality for performing deduplication and compression operations for a storage system by offloading at least a portion of a compression operation to one or more storage devices of the storage system in other embodiments.

Additional examples of content addressable storage functionality implemented in some embodiments by control modules 508C, data modules 508D, routing modules 508R and management module(s) 508M of distributed storage controller 508 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of host devices or storage systems with functionality for performing deduplication and compression operations for a storage system by offloading at least a portion of a compression operation to one or more storage devices of the storage system can provide a number of significant advantages relative to conventional arrangements. For example, some embodiments provide techniques for the efficient compression computations, thus reducing CPU and/or bandwidth overheads at the host device or storage controller level by leveraging the processing resources internal to the storage devices of the storage system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for performing deduplication and compression operations for a storage system by offloading at least a portion of a compression operation to one or more storage devices of the storage system will now be described in greater detail with reference to FIGS. 6 and 7. Although described in the context of system 100, these platforms may also be used to implement at least portions of other information processing systems in other embodiments.

Figure 6:
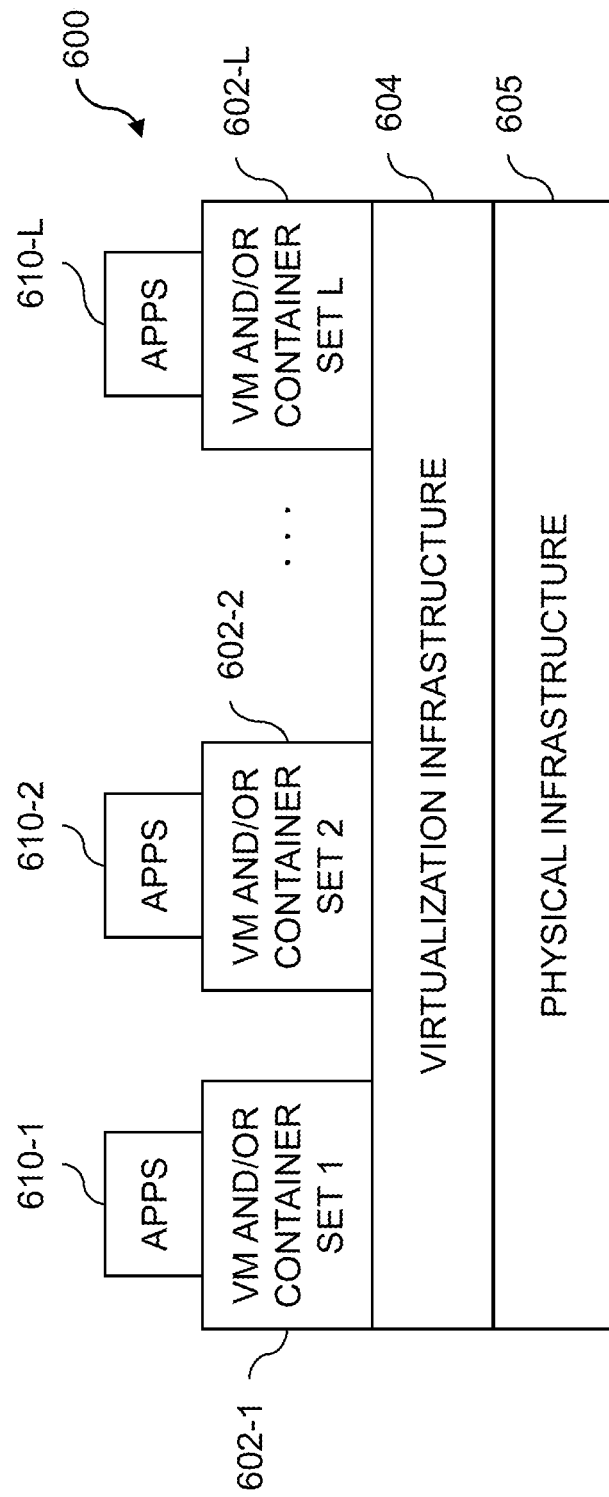
FIGS. 6 and 7 show examples of processing platforms that may be utilized to implement at least a portion of an information processing system in illustrative embodiments.
Figure 7:
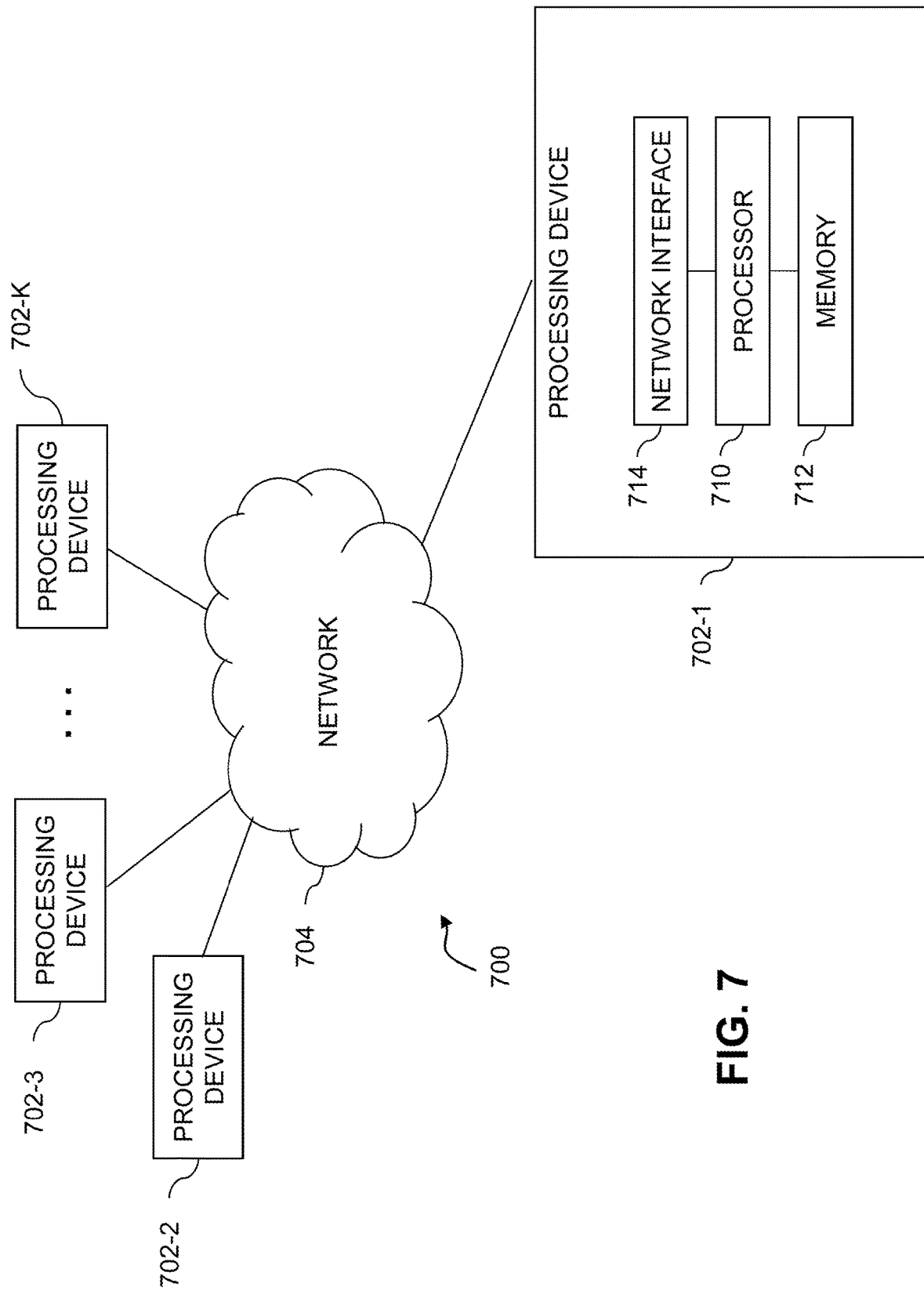

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for performing deduplication and compression operations for a storage system by offloading at least a portion of a compression operation to one or more storage devices of the storage system of the type described above for one or more processes running on a given one of the VMs. For example, each of the VMs can implement such functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide functionality for performing deduplication and compression operations for a storage system by offloading at least a portion of a compression operation to one or more storage devices of the storage system of the type described above for one or more processes running on different ones of the containers. For example, a container host device supporting multiple containers of one or more container sets can implement one or more instances of such functionality or logic.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 or 200 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 or 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for performing deduplication and compression operations for a storage system by offloading at least a portion of a compression operation to one or more storage devices of the storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, compression algorithms, similarity scores, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
in an information processing system implementing data deduplication and compression, wherein the information processing system comprises a set of data storage devices;
at least one of the data storage devices comprising a processing device configured:
to receive, from the information processing system, an instruction to perform at least a portion of a compression operation;
to perform the portion of the compression operation in response to the instruction; and
to send a result of the performed portion of the compression operation to the information processing system;
the processing device being further configured to execute at least one of the following processes:
(i) wherein when the instruction comprises new data to be written in a compressed format, the portion of the compression operation performed by the processing device of the at least one data storage device comprises:
performing standalone compression of the new data;
performing differential compression of the new data with reference to existing data stored on the at least one storage device; and
storing one of the standalone compressed new data and the differential compressed new data based at least in part on a comparison of a first compression ratio of the standalone compressed new data and a second compression ratio of the differential compressed new data; or
(ii) wherein when the instruction comprises new data to be written and a similarity score associated with the new data:
performing the portion of the compression operation comprises comparing the similarity score associated with the new data to one or more similarity scores associated with existing data stored on the at least one storage device; and
sending the result of the performed portion of the compression operation to the information processing system comprises providing a measure of similarity between the similarity score associated with the new data and the one or more similarity scores associated with the existing data stored on the at least one storage device.

2. The apparatus of claim 1 wherein, when the processing device executes process (i), performing the differential compression of the new data comprises utilizing a compression algorithm which allows the compressed new data to have one or more references to the existing data.

3. The apparatus of claim 1 wherein, when the processing device executes process (ii), the processing device is further configured:
to receive, from the information processing system, an additional instruction to store the new data on the at least one storage device, the additional instruction being based at least in part on the measured similarity between the similarity score associated with the new data and the one or more similarity sores associated with the existing data stored on the at least one storage device;
to perform an additional portion of the compression operation in response to the additional instruction, the additional portion of the compression operation comprising compressing the new data and storing the compressed new data on the at least one storage device.

4. The apparatus of claim 1 wherein, when the processing device executes process (ii), the similarity score associated with the new data is determined using a rolling hash with a designated window size.

5. The apparatus of claim 4 wherein the rolling hash comprises a sliding window Rabin hash.

6. The apparatus of claim 1 wherein, when the processing device executes process (ii), at least one of a host device of the information processing system and the processing device of the at least one data storage device is further configured to maintain, in a memory of the at least one data storage device, a cache of similarity scores associated with the existing data stored on the at least one data storage device.

7. The apparatus of claim 6 wherein the cache comprises a least recently used (LRU) cache configured to maintain similarity scores for a designated threshold number of existing data items most recently stored on the at least one data storage device.

8. The apparatus of claim 6 wherein the cache is configured to maintain similarity scores for a designated threshold number of frequently accessed existing data items stored on the at least one data storage device.

9. The apparatus of claim 1 wherein, when the processing device executes process (ii), the processing device is further configured:
to maintain, in a memory of the at least one data storage device, dependency data for differential compressed existing data stored on the at least one data storage device; and
to utilize the dependency data to determine, when receiving requests to overwrite existing data stored on the at least one storage device using differential compression data, whether to overwrite the differential compression data.

10. The apparatus of claim 9 wherein determining whether to overwrite the differential compression data comprises, for a given existing data item stored using the differential compression data:
determining, utilizing the dependency data, a number of other existing data items that reference the differential compression data for the given existing data item;
if the number of other existing data items that reference the differential compression data for the given existing data item is below a designated threshold, decompressing the other existing data items that reference the differential compression data and recompressing the other existing data items that reference the differential compression data by performing standalone compression of the other existing data items.

11. The apparatus of claim 1 wherein the set of data storage devices comprise solid state drives (SSDs).

12. The apparatus of claim 11 wherein the processing device associated with the at least one data storage device comprises one or more of a central processing unit and a hardware accelerator internal to the SSDs.

13. A method comprising:
in an information processing system implementing data deduplication and compression, wherein the information processing system comprises a set of data storage devices, receiving by at least one of the data storage devices comprising a processing device an instruction from the information processing system to perform at least a portion of a compression operation;
performing the portion of the compression operation in response to the instruction; and
sending a result of the performed portion of the compression operation to the information processing system;
the method further comprising at least one of the following processes:
(i) wherein when the instruction comprises new data to be written in a compressed format, the portion of the compression operation performed by the processing device of the at least one data storage device comprises:
performing standalone compression of the new data;
performing differential compression of the new data with reference to existing data stored on the at least one storage device; and
storing one of the standalone compressed new data and the differential compressed new data based at least in part on a comparison of a first compression ratio of the standalone compressed new data and a second compression ratio of the differential compressed new data; or
(ii) wherein when the instruction comprises new data to be written and a similarity score associated with the new data:
performing the portion of the compression operation comprises comparing the similarity score associated with the new data to one or more similarity scores associated with existing data stored on the at least one storage device; and
sending the result of the performed portion of the compression operation to the information processing system comprises providing a measure of similarity between the similarity score associated with the new data and the one or more similarity scores associated with the existing data stored on the at least one storage device.

14. The method of claim 13, wherein, when process (ii) is executed, the method further comprises:
receiving, from the information processing system, an additional instruction to store the new data on the at least one storage device, the additional instruction being based at least in part on the measured similarity between the similarity score associated with the new data and the one or more similarity sores associated with the existing data stored on the at least one storage device;
performing an additional portion of the compression operation in response to the additional instruction, the additional portion of the compression operation comprising compressing the new data and storing the compressed new data on the at least one storage device.

15. The method of claim 13, wherein, when process (ii) is executed, at least one of a host device of the information processing system and the processing device of the at least one data storage device is further configured to maintain, in a memory of the at least one data storage device, a cache of similarity scores associated with the existing data stored on the at least one data storage device.

16. The method of claim 13, wherein, when process (ii) is executed, the method further comprises:
maintaining, in a memory of the at least one data storage device, dependency data for differential compressed existing data stored on the at least one data storage device; and
utilizing the dependency data to determine, when receiving requests to overwrite existing data stored on the at least one storage device using differential compression data, whether to overwrite the differential compression data.

17. A computer program product comprising a non-transitory processor-readable storage medium having stored therein program code of one or more software programs, wherein the program code when executed by at least one processing device of at least one data storage device causes said at least one processing device:
in an information processing system implementing data deduplication and compression, wherein the information processing system comprises a set of data storage devices including the at least one data storage device, to receive by the at least one data storage device an instruction from the information processing system to perform at least a portion of a compression operation;
to perform the portion of the compression operation in response to the instruction; and
to send a result of the performed portion of the compression operation to the information processing system;
the program code being further configured to cause the at least one processing device to perform at least one of the following processes:
(i) wherein when the instruction comprises new data to be written in a compressed format, the portion of the compression operation performed by the processing device of the at least one data storage device comprises:
performing standalone compression of the new data;
performing differential compression of the new data with reference to existing data stored on the at least one storage device; and
storing one of the standalone compressed new data and the differential compressed new data based at least in part on a comparison of a first compression ratio of the standalone compressed new data and a second compression ratio of the differential compressed new data; or
(ii) wherein when the instruction comprises new data to be written and a similarity score associated with the new data:
performing the portion of the compression operation comprises comparing the similarity score associated with the new data to one or more similarity scores associated with existing data stored on the at least one storage device; and
sending the result of the performed portion of the compression operation to the information processing system comprises providing a measure of similarity between the similarity score associated with the new data and the one or more similarity scores associated with the existing data stored on the at least one storage device.

18. The computer program product of claim 17 wherein, when process (ii) is executed, the at least one processing device is further configured:

to receive, from the information processing system, an additional instruction to store the new data on the at least one storage device, the additional instruction being based at least in part on the measured similarity between the similarity score associated with the new data and the one or more similarity sores associated with the existing data stored on the at least one storage device;

to perform an additional portion of the compression operation in response to the additional instruction, the additional portion of the compression operation comprising compressing the new data and storing the compressed new data on the at least one storage device.

19. The computer program product of claim 17 wherein, when process (ii) is executed, at least one of a host device of the information processing system and the processing device of the at least one data storage device is further configured to maintain, in a memory of the at least one data storage device, a cache of similarity scores associated with the existing data stored on the at least one data storage device.

20. The computer program product of claim 17 wherein, when process (ii) is executed, the at least one processing device is further configured:

to maintain, in a memory of the at least one data storage device, dependency data for differential compressed existing data stored on the at least one data storage device; and to utilize the dependency data to determine, when receiving requests to overwrite existing data stored on the at least one storage device using differential compression data, whether to overwrite the differential compression data.

* * * * *